United States Patent [19]

Paraghamian et al.

[11] 4,237,635
[45] Dec. 9, 1980

[54] REACTION TRAINING APPARATUS

[76] Inventors: Aram C. Paraghamian, 6133 Russell, Mission, Kans. 66202; Robert C. Kelly, 8115 Glencliffe, Houston, Tex. 77070

[21] Appl. No.: 782,024

[22] Filed: Mar. 28, 1977

[51] Int. Cl.³ ............................................. G09F 11/16
[52] U.S. Cl. ........................................ 40/463; 40/472
[58] Field of Search .................... 35/22 R, 74, 76, 77, 35/29 R, 29 D; 40/32, 77.4, 77.6, 77.7, 463, 472; 272/93, DIG. 5; 128/24 R, 25 R

[56] References Cited

U.S. PATENT DOCUMENTS

| | | | |
|---|---|---|---|
| 1,564,138 | 12/1925 | Rowland | 35/22 R X |
| 1,634,194 | 6/1927 | Jacobs | 35/74 |
| 1,765,073 | 6/1930 | Hester et al. | 40/77.7 X |
| 2,260,432 | 10/1941 | Brown | 35/22 R X |
| 2,678,692 | 5/1954 | Ranseen | 35/22 R |
| 3,024,020 | 3/1962 | Alton | 35/22 R X |
| 3,523,374 | 8/1970 | Schuster | 35/22 R X |

FOREIGN PATENT DOCUMENTS

| | | | |
|---|---|---|---|
| 402794 | 9/1924 | Fed. Rep. of Germany | 35/22 R |
| 283722 | 1/1928 | United Kingdom | 40/77.7 |

*Primary Examiner*—William H. Grieb
*Attorney, Agent, or Firm*—Bacon & Thomas

[57] ABSTRACT

A pair of endless belts of different lengths are intermittently and simultaneously advanced in sequential steps to present first and second indicia behind a viewing window. Each of the indicia on one belt identifies a movable part of a person's body and each of the indicia on the other belt identifies a movement to be performed. The indicia on each belt include a plurality of legends identifying each body part or movement, respectively, but arranged randomly in series on the belts. A selectively operable control serves to vary the time interval between sequential steps.

5 Claims, 7 Drawing Figures

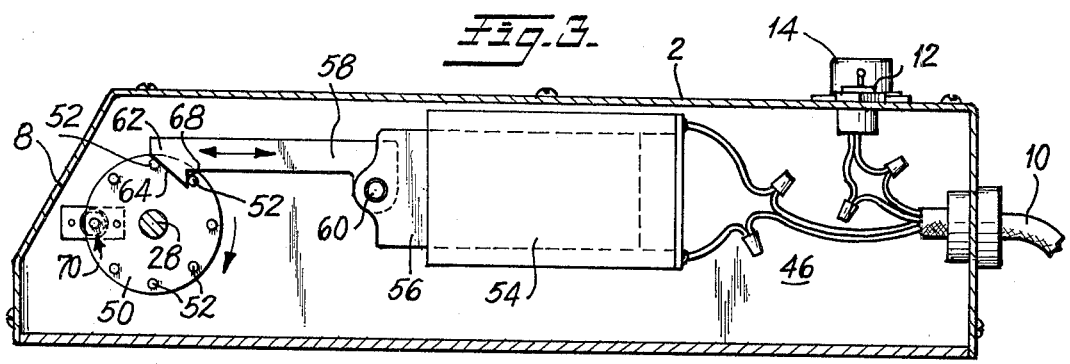
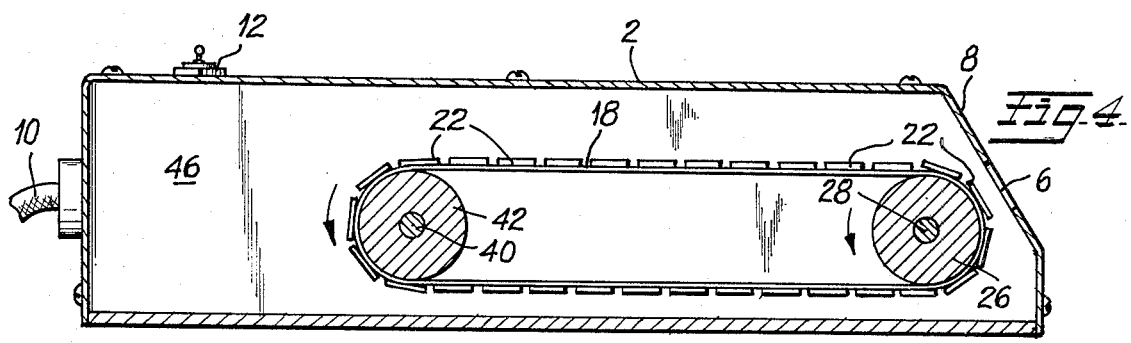
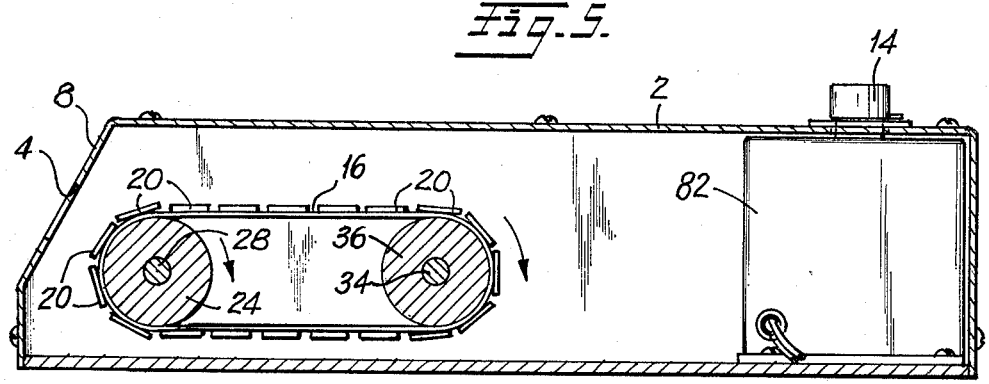
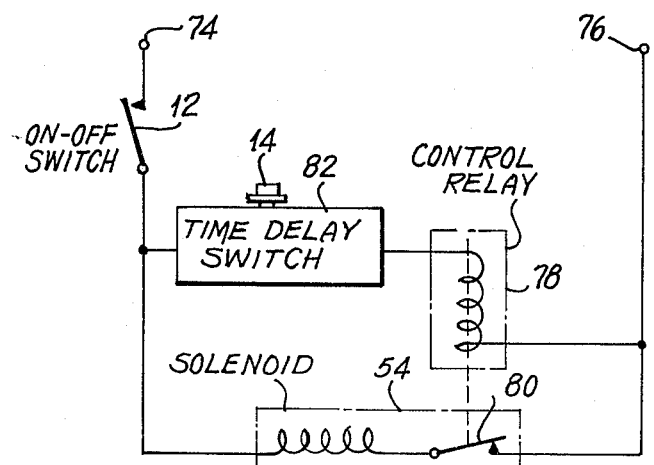
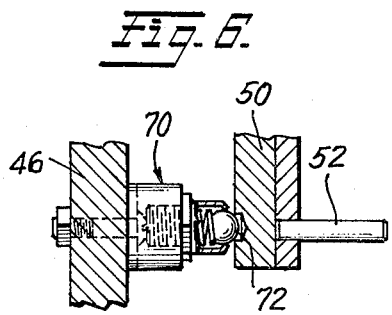

REACTION TRAINING APPARATUS

BACKGROUND OF THE INVENTION

This invention is in the field of training devices for training subjects to respond to visual commands or instructions.

There is need for a training device for training or therapy to develop a patient's reaction response to visual or similar commands or instructions. Such devices would be useful in hospitals for physical therapy departments in the rehabilitation of cardiac and surgical patients. There is also need for such devices for use in schools for retarded children and in nursing homes for use by the aged whose reflexes are deteriorating from lack of exercise of both mind and body. There is also need for such a device to be used by neurologists, orthopedic specialists, and by physicians who need to test patients' mind and body reflex correlation. Such devices would also find use by athletes to increase their quickness of reaction. Devices of this general nature have been proposed wherein electrically generated commands were presented to a subject or wherein situations requiring a response were projected visually. See U.S. Pat. Nos. 3,024,020; 1,564,138; 2,260,432; 3,523,374 and 2,678,692.

SUMMARY OF THE INVENTION

The present invention employs a device for displaying sequential and nearly randomly arranged visual commands or instructions requiring movements of both upper and lower extremities in sequence at timed intervals, which time intervals can be varied to accommodate the progress of the patient. As the patient progresses and his response time improves, the time between displayed commands may be shortened progressively until the desired training has been achieved.

In general, the commands comprise a first display indicating a portion of the body to be moved and a second display indicating the particular movement to be made. For example, one window may display, in sequence, any one of six parts of the body and the adjacent window will display, simultaneously, one of five positions to be assumed by the body part indicated in the first window. The number of indications in the series available for each window is different from that of the other so that simultaneous progression of displays in the windows comprises a series of commands greater in number than the number of separate indicia available to either window. In a preferred embodiment of the invention, the different indicia are mounted on endless belts of different lengths movable simultaneously and in equal steps past the windows referred to. The arrangement makes the total sequence difficult to remember and virtually confronts the subject with a continuously random set of commands to which he must respond.

BRIEF DESCRIPTION OF THE DRAWINGS

FIG. 3 is a vertical sectional view taken on the line 3—3 of FIG. 2;

FIG. 4 is a vertical sectional view taken on the line 4—4 of FIG. 2;

FIG. 5 is a vertical sectional view taken on the line 5—5 of FIG. 2;

FIG. 6 is an enlarged sectional view taken on the line 6—6 of FIG. 2; and

FIG. 7 is a diagrammatic view of the electrical circuits employed in the illustrated device.

DESCRIPTION OF A PREFERRED EMBODIMENT

Figure 1:
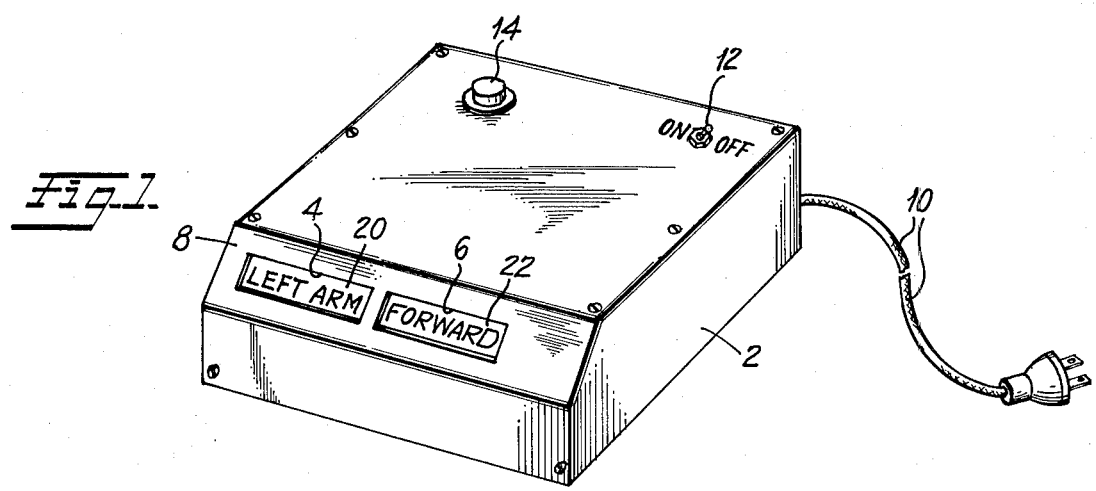
FIG. 1 is a perspective over-all view of a device embodying the present invention.
Figure 2:
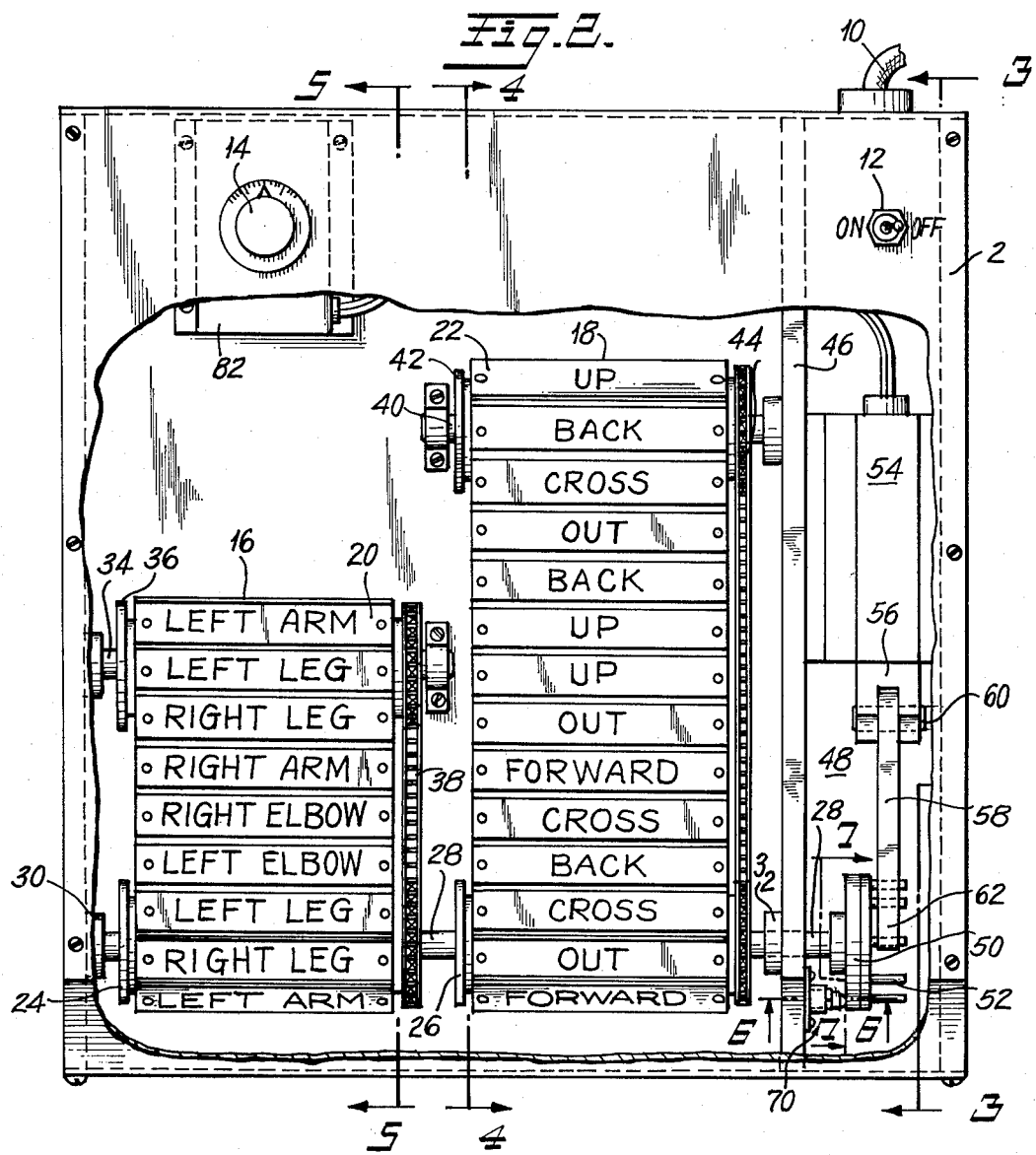
FIG. 2 is a top plan view of applicant's device with a portion of the cover broken away to illustrate internal features.

Referring first to FIG. 1, a housing 2 is illustrated having a pair of windows 4 and 6 in a sloping wall portion 8. Also illustrated is the power cord 10 of usual construction, an on-off switch 12, and a cycle time control member 14.

As best shown in FIGS. 2-5, the housing 2 encloses a pair of endless belts 16 and 18, each having thereon a plurality of plates 20 and 22. The plates are the same size and spacing on both belts. The plates 20 on belt 16 each indicate a portion of a subjects's body to be exercised and, as shown, there are 19 such plates on the belt 16 identifying six parts of the body. Obviously, the designation of certain body parts are duplicated but the arrangement in the series appearing on the belt is random, that is, there is no repeated arrangement on the belt.

The belt 18, as shown, is provided with 30 of the plates 22 on which five different exercise positions are designated in a continuous endless series wherein the different positions are randomly arranged even though each is repeated several times in the series. Obviously, the belt 22 is longer than the belt 16. Each of the belts is mounted on a forward drum assembly 24-26, fixed to a common rotatable shaft 28, supported in bearings 30 and 32. The drums 24-26 may take any desired form as long as they guide the belts 16 and 18 to sequentially present their indicia in the windows 4 and 6. A rear shaft 34 supports a rear drum 36 over which the belt 16 is trained and an endless chain 38 is trained over sprockets fixed to the shafts 28 and 34, respectively, to ensure synchronous rotation of the drums 24 and 36 to thus minimize any chance of slippage of the belt 16 during operation.

In like manner a second rear shaft 40 supports a rear drum 42 over which the longer belt 18 is trained. A second sprocket chain 44 ensures synchronous rotation of the shaft 40 with front shaft 28 to again minimize the likelihood of belt slippage.

The interior of the housing 2 is provided with a partition or frame member 46 defining a compartment 48 into which shaft 28 extends. Fixed to the end of shaft 28 in compartment 48 is an indexing disc 50 provided with axially extending pins 52. The angular spacing between pins 52 is equal to the angular spacing between the center lines of the plates 20 and 22 when they are arranged around either drum 24 or 26.

A solenoid 54 is mounted in compartment 48 and is provided with an armature 56 normally spring urged toward the left as viewed in FIG. 3 by spring means, not shown, but which are conventional and known to those in the art. The armature 56 is provided with a pawl 58 pivoted to the armature at 60 and provided at its free end with a hook member 62 having an angled edge 64 and a shoulder 68, all as clearly shown in FIG. 3. In its energized condition, the solenoid armature holds the pawl 58 with its shoulder 68 bearing against one of the pins 52 and with its angled edge 64 resting on an adjacent pin 52 at the top of disc 50, as shown in FIG. 3. Thus, when the solenoid is deenergized, its armature moves to the left under the influence of the spring means and this causes the sloping surface 64 to ride upwardly over the topmost pin 52 on disc 50 until shoulder 68 drops behind that uppermost pin. Then, when the current to the solenoid is restored, the armature and pawl are drawn to the right and the shoulder 68 then pulls uppermost pin 52 downwardly to impart a single step of rotation to the disc 50 and, consequently, the shaft 28 and drums 24 and 26. This step of rotation causes the next adjacent plates 20 and 22 to appear behind windows 4 and 6 to change the command.

To ensure that the shaft 28 remains stationary between sequential steps, there is provided a ball detent mechanism 70 shown in greater detail in FIG. 6. As shown, a spring pressed ball detent assembly 70, which may be of any suitable form, is secured to the partition wall 46 adjacent the disc 52. On the face of the disc nearest wall 46 there are provided a plurality of depressions 72 each corresponding to one of the pins 52. At each step of operation of the solenoid 54 as previously described, the ball detent is caused to engage the next depression 72 and thereby releasably hold the shaft 28 in its advanced position.

FIG. 7 is a schematic view illustrating the electrical circuits. As shown, the solenoid 54 is connected to a power source represented by terminals 74 and 76 through the on-off switch 12. When the switch 12 is closed, the solenoid is immediately energized to cause pawl 58 to assume the position shown in FIG. 3. A control relay 78 is arranged to actuate a swtich 80 in the solenoid circuit and the control relay 78 is in turn controlled by a time-delay switch 82. As shown, the time delay switch 82 and control relay are connected across the power source. The time delay switch 82 which may be of any suitable type known to those skilled in the art, is effective periodically and at timed intervals to close a circuit through the coil of control relay 78. When that occurs the switch 80 is opened, thus deenergizing the solenoid 54 and permitting its spring to project pawl 58 to the left as seen in FIG. 3, to engage the next pin 52, as described. The output of the time delay switch 82 is in the nature of a pulse of short duration so that the circuit through the solenoid 54 is immediately closed after being opened, thus drawing the armature 56 to the right as shown in FIG. 3, to advance the display in windows 4 and 6 through one step. The control 14 for time delay switch 82 may be manipulated as desired to change the time interval between actuations of the control relay 78 and thus regulate the time during which each sequential step of commands is held in display position. It will be obvious that the apparatus described above will perform the desired operations and is relatively simple in construction and reliable in operation.

It will also be apparent that the random arrangement of indicia on the two belts 16 and 18 with the two belts being of different lengths provides for display of a series of commands which series will not be repeated in any reasonable time thus ensuring that the subject cannot memorize the sequence of commands. For example, with 30 plates on the belt 18, and 19 plates on the belt 16, a series of different commands totalling 570 combinations will be displayed before the same series is again repeated. If desired, either of the belts 16 or 18 may be forcibly advanced or retarded about its drums if it is desired to change the sequence of commands in the total series. Other means may also be provided for changing the relative positions of the belts, if desired.

Although endless belts are shown and described, obviously the indicia could be provided on rigid drums or even on separate plates or cards sequentially dropped into viewing position.

While a single specific embodiment of the invention has been shown and described herein, the same is merely illustrative of the principles involved and it will be obvious that other embodiments may be employed within the scope of the appended claims.

We claim:

1. Reaction training apparatus comprising:
   housing means defining a viewing station;
   a pair of indicia bearing display means movably mounted in said housing adjacent said viewing station, each of said display means having a plurality of indicia arranged in an endless series and each being movable to sequentially present successive indicia at said viewing station, the series on one of said display means having a number of indicia different from the number of indicia in the series on the other;
   each of the indicia on one of said display means identifying a movable part of a person's body, there being a plurality of indicia identifying each movable part with the indicia randomly arranged in said series; each of said indicia on said other display means identifying an exercise to be performed, there being a plurality of indicia indentifying each exercise with the indicia randomly arranged in the series, each body part and each exercise appearing more than once in their respective series; and
   drive means for intermittently moving both said display means simultaneously to intermittently and simultaneously present successive indicia of each series at said viewing station, said drive means being arranged to move said display means in discrete successive steps; and control means for selectively changing the time interval between successive steps.

2. Apparatus as defined in claim 1 wherein said drive means is a solenoid actuated ratchet device and wherein said control means is a selectively variable time delay switch for said solenoid.

3. Apparatus as defined in claim 1 wherein said display means comprise endless belts of respectively different lengths trained around a common rotary member adjacent said viewing station, said indicia being carried by plates mounted on said belts in equally spaced relation.

4. Apparatus as defined in claim 3 wherein said drive means is a solenoid actuated ratchet device arranged to intermittently rotate said rotary member is sequential steps.

5. Apparatus as defined in claim 4 including detent means for releasably holding said rotary member stationary between intermittent operations of said ratchet device.

* * * * *